United States Patent Office 2,884,438
Patented Apr. 28, 1959

2,884,438

O-CYCLOHEXYLPHENYL O,O-DIALKYL PHOSPHOROTHIOATES

Kenneth C. Kauer, Midland, Mich., assignor to The Dow Chemical Company, Midland, Mich., a corporation of Delaware No Drawing. Application April 2, 1956
Serial No. 580,426

6 Claims. (Cl. 260—461)

This invention is directed to the O-cyclohexylphenyl O,O-dialkyl phosphorothioates having the formula:

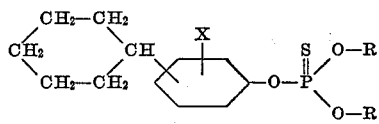

In this and succeeding formulae, X represents hydrogen, bromine or chlorine and R represents methyl or ethyl. These new compounds are viscous liquids or crystalline solids which are somewhat soluble in many organic solvents and of very low solubility in water. The new compounds are useful as plant growth control agents and adapted to be employed for the control of the growth and killing of weeds and for the sterilization of soil with regard to plant growth. The compounds are also useful as parasiticides and adapted to be employed for the control of mite and insect pests such as aphids and flies.

The new compounds may be prepared by reacting an O-(cyclohexylphenyl) phosphorodichloridothioate having the formula:

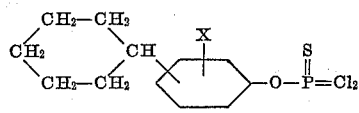

with an alkali metal methylate or an alkali metal ethylate. The alcoholate employed is preferably the sodium salt and may be prepared by reacting methanol or ethanol with sodium in an inert organic solvent and conveniently in an excess of the corresponding alcohol. The reaction is carried out in an inert organic solvent and conveniently in the alcohol employed in the preparation of the alcoholate. Good results are obtained when employing at least two molecular portions of the alcoholate with each molecular portion of the O-(cyclohexylphenyl) phosphorodichloridothioate. The reaction takes place smoothly at the temperature range of from 0° to 60° C. with the formation of the desired product and alkali metal chloride of reaction. The reaction is exothermic and the temperature may be controlled by regulating the rate of contacting the reagents and by external cooling.

In carrying out the reaction, a solution of the alkali metal alcoholate, preferably the sodium salt, in the reaction solvent is contacted portionwise with the phosphorodichloridothioate reagent dispersed in the solvent. The contacting is carried out with stirring and at a temperature of from 0° to 60° C. Upon completion of the reaction, the solvent may be removed from the reaction mixture by evaporation and the residue dissolved in a water immiscible organic solvent such as methylene dichloride, carbon tetrachloride or benzene. The resultant mixture may be successively washed with water and dilute aqueous sodium hydroxide. The separation of the desired product is then accomplished by evaporation of the solvent.

The following examples illustrate the invention but are not to be construed as limiting.

EXAMPLE 1

*O-(2-cyclohexylphenyl) O,O-dimethyl phosphorothioate*

A quantity of sodium (9.2 grams, 0.4 mole) was dissolved in 300 milliliters of methanol to prepare a methanol solution of the corresponding alcoholate. This solution was added slowly portionwise over a period of 0.5 hour to 62 grams (0.2 mole) of O-(2-cyclohexylphenyl) phosphorodichloridothioate dissolved in 200 milliliters of methanol. The addition was carried out with stirring and cooling and at a temperature of from 12° to 17° C. Following the addition, stirring was continued for 0.25 hour to complete the reaction. The reaction mixture was then neutralized by the addition of a small quantity of glacial acetic acid and the methanol thereafter removed by evaporation. The residue was then dissolved in 300 milliliters of benzene and the benzene solution washed with water. The benzene solution was then fractionally distilled under reduced pressure at temperatures gradually increasing up to a temperature of 50° C. to obtain an O-(2-cyclohexylphenyl) O,O-dimethyl phosphorothioate product as a liquid residue. This product had a density of 1.144 at 25° C., a refractive index $n/D$ of 1.5353 at 25° C. and a phosphorus content of 9.48 percent as compared to a theoretical content of 9.45 percent.

EXAMPLE 2

*O-(2-cyclohexylphenyl) O,O-diethyl phosphorothioate*

Sodium (9.2 grams, 0.4 mole) was dissolved in 300 milliliters of ethanol to prepare an ethanol solution of the corresponding alcoholate. This solution was added slowly portionwise to 62 grams (0.2 mole) of O-(2-cyclohexylphenyl) phosphorodichloridothioate dissolved in 200 milliliters of ethanol. The addition was carried out with stirring and cooling and at a temperature of 12° to 18° C. Stirring was thereafter continued for 15 minutes to complete the reaction. The reaction mixture was then processed as described in Example 1 to obtain an O-(2-cyclohexylphenyl) O,O-diethyl phosphorothioate product as a viscous liquid. This product had a density of 1.129 at 25° C., a refractive index $n/D$ of 1.5316 at 25° C. and a phosphorus content of 9.48 percent as compared to a theoretical content of 9.45 percent.

EXAMPLE 3

*O-(4-chloro-2-cyclohexylphenyl) O,O-dimethyl phosphorothioate*

Sodium (0.4 mole) was dissolved in 300 milliliters of methanol to prepare an alcoholic solution of the corresponding alcoholate. This alcoholate was reacted with 0.2 mole of O-(4-chloro-2-cyclohexylphenyl) phosphorodichloridothioate and the reaction mixture processed in the manner as described in Example 1 to obtain an O-(4-chloro-2-cyclohexylphenyl) O,O-dimethyl phosphorothioate product as a viscous liquid. This product had a density of 1.201 at 25° C. and a refractive index $n/D$ of 1.5415 at 25° C.

EXAMPLE 4

*O-(4-chloro-2-cyclohexylphenyl) O,O-diethyl phosphorothioate*

In a similar manner sodium ethylate was reacted with O-(4-chloro-2-cyclohexylphenyl) phosphorodichloridothioate to obtain an O-(4-chloro-2-cyclohexyphenyl) O,O-diethyl phosphorothioate product as a viscous liquid. This product had a density of 1.173 at 25° C., a refractive index $n/D$ of 1.5339 at 25° C. and sulfur, phosphorus, and chlorine contents of 8.77 percent, 8.51 percent and 10.73 percent, respectively, as compared to the theoretical contents of 8.8, 8.55 and 9.78 percent.

EXAMPLE 5

*O-(4-cyclohexylphenyl) O,O-dimethyl phosphorothioate*

Sodium (0.2 mole) was dissolved in 200 milliliters of methanol to prepare a methanol solution of sodium methylate. This solution was added slowly portionwise to 0.2 mole of O-(4-cyclohexylphenyl) phosphorodichloridothioate dissolved in a mixture of 200 milliliters of methanol and 100 milliliters of methylene dichloride. The addition was carried out with stirring and cooling and at a temperature of from 10° to 17° C. The reaction solvent was then removed by evaporation to obtain an O-(4-cyclohexylphenyl) O,O-dimethyl phosphorothioate product as a crystalline residue. This product was dissolved in benzene and the benzene solution washed with water. The benzene solution was then fractionally distilled under reduced pressure at temperatures gradually increasing up to 45° C. to remove the benzene. The crystalline residue was then recrystallized from petroleum ether and found to melt at 57° to 58° C.

EXAMPLE 6

*O-(4-cyclohexylphenyl) O,O-diethyl phosphorothioate*

Sodium (0.4 mole) was dissolved in 300 milliliters of ethanol and the resulting solution added slowly portionwise to 0.2 mole of O-(4-cyclohexylphenyl) phosphorodichloridothioate dissolved in 250 milliliters of methylene dichloride. The addition was carried out with stirring and cooling and at a temperature of from 12° to 17° C. The reaction mixture was then processed as described in Example 1 to obtain an O-(4-cyclohexylphenyl) O,O-diethyl phosphorothioate product as a viscous liquid. This product had a density of 1.123 at 25° C. and a refractive index n/D of 1.5312 at 25° C.

EXAMPLE 7

*O-(2-bromo-4-cyclohexylphenyl) O,O-diethyl phosphorothioate*

Sodium ethylate is reacted with O-(2-bromo-4-cyclohexylphenyl) phosphorodichloridothioate in the manner as described in Example 1 to obtain an O-(2-bromo-4-cyclohexylphenyl) O,O-diethyl phosphorothioate product as a viscous liquid having a molecular weight of 407.

The compounds of the present invention are valuable as parasiticides for the control of insect pests and for the treatment of soil for the control of the growth of seeds and emerging seedlings of many undesirable plant species. For such use, the compounds may be dispersed on a finely divided solid and employed as dusts. Also, the new products may be employed in oils, as constituents in aqueous emulsions or in aqueous dispersions. In representative operations good controls of the growth of many varieties of seeds and emerging seedlings are obtained with the new phosphorothioate compounds at dosages of 50 pounds per acre.

The O-(cyclohexylphenyl) phosphorodichloridothioates employed as starting materials as herein described may be prepared by reacting a molecular excess of phosphorus thiochloride ($PSCl_3$) with an alkali metal salt of a cyclohexylphenol or cyclohexyl-halo-phenol. Good results are obtained when employing from 2 to 4 moles of phosphorus thiochloride per mole of the alkali metal salt. The alkali metal salt, preferably the sodium salt, is added portionwise with stirring to the phosphorus thiochloride and the mixture subsequently warmed for a period of time to complete the reaction. The reaction mixture is then filtered and the filtrate distilled under reduced pressure to separate the product.

I claim:
1. A compound having the formula

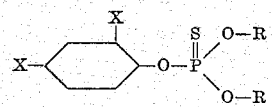

wherein one X represents cyclohexyl and the other X represents a member of the group consisting of hydrogen, bromine and chlorine, and R represents a member of the group consisting of methyl and ethyl.

2. O-(4-chloro-2-cyclohexylphenyl) O,O-dimethyl phosphorothioate.

3. O-(4-chloro-2-cyclohexylphenyl) O,O-diethyl phosphorothioate.

4. O-(4-cyclohexylphenyl) O,O-dimethyl phosphorothioate.

5. O-(2-cyclohexylphenyl) O,O-dimethyl phosphorothioate.

6. O-(4-cyclohexylphenyl) O,O-diethyl phosphorothioate.

References Cited in the file of this patent

UNITED STATES PATENTS

| | | |
|---|---|---|
| 2,506,344 | Cleary | May 2, 1950 |
| 2,657,229 | Orochena | Oct. 27, 1953 |
| 2,692,891 | Young et al. | Oct. 26, 1954 |
| 2,770,567 | Wedemeyer | Nov. 13, 1956 |